US012619857B2

(12) United States Patent
Berkeman et al.

(10) Patent No.: US 12,619,857 B2
(45) Date of Patent: May 5, 2026

(54) METHODS AND APPARATUSES FOR BOTTLENECK STAGES IN NEURAL-NETWORK PROCESSING

(71) Applicant: Telefonaktiebolaget LM Ericsson (publ), Stockholm (SE)

(72) Inventors: Anders Berkeman, Lund (SE); Sven Karlsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 622 days.

(21) Appl. No.: 18/031,065

(22) PCT Filed: Oct. 14, 2020

(86) PCT No.: PCT/EP2020/078968
§ 371 (c)(1),
(2) Date: Apr. 10, 2023

(87) PCT Pub. No.: WO2022/078601
PCT Pub. Date: Apr. 21, 2022

(65) Prior Publication Data
US 2023/0409883 A1      Dec. 21, 2023

(51) Int. Cl.
*G06N 3/0464* (2023.01)

(52) U.S. Cl.
CPC .................................. *G06N 3/0464* (2023.01)

(58) Field of Classification Search
CPC .................................................... G06N 3/0464
See application file for complete search history.

(56) References Cited

U.S. PATENT DOCUMENTS

| | | | | |
|---|---|---|---|---|
| 12,008,469 B1 * | 6/2024 | Hah | .......................... | G06N 3/08 |
| 2020/0034148 A1 * | 1/2020 | Sumbul | ................. | G06F 17/153 |
| 2020/0082254 A1 * | 3/2020 | Dally | ..................... | G06N 3/063 |
| 2020/0298080 A1 * | 9/2020 | Zhang | ..................... | G06T 7/207 |
| 2021/0021709 A1 * | 1/2021 | Scodary | .............. | H04M 3/5234 |

(Continued)

OTHER PUBLICATIONS

Bai, Lin , et al., "A CNN Accelerator on FPGA Using Depthwise Separable Convolution", Arxiv.org, Cornell University Library, 201 Olin Library Cornell University Ithaca, NY 14853, XP081079280, Sep. 3, 2018, 5 pages.

(Continued)

*Primary Examiner* — Haimei Jiang
*Assistant Examiner* — Thomas Bernard Lane
(74) *Attorney, Agent, or Firm* — Murphy, Bilak & Homiller, PLLC

(57) ABSTRACT

Methods and apparatuses herein improve bottleneck-layer processing in neural networks. Example advantages include reducing the number of accesses needed to external memory, allowing processing to run in parallel in successive bottleneck layers, based on the use of partial convolutional results, and balancing the amount of "local" memory used for storing convolutional results against the computational overhead of recomputing partial results. One aspect of the methods and apparatuses involves co-locating arithmetic and logical operators and temporary storage in the same data path, with the approach yielding both higher performance and greater energy efficiency in the implementation of bottleneck layers for neural network processing.

19 Claims, 4 Drawing Sheets

(56) References Cited

U.S. PATENT DOCUMENTS

| | | | | |
|---|---|---|---|---|
| 2021/0029248 A1* | 1/2021 | Scodary | ................ | G06F 16/683 |
| 2023/0290134 A1* | 9/2023 | Hu | ........................ | G06N 3/0464 |

OTHER PUBLICATIONS

Chen, Hong-Yen , et al., "An Enhanced Hybrid MobileNet", 2018 9th International Conference on Awareness Science and Technology (iCAST), Fukuoka, 2018, pp. 308-312.

He, Kaiming , et al., "Deep Residual Learning for Image Recognition", 2016 IEEE Conference on Computer Vision and Pattern Recognition (CVPR), Las Vegas, NV, 2016, pp. 770-778.

Ignatov, Andrey D, et al., "AI Benchmark: All About Deep Learning on Smartphones in 2019", IEEE/CVF International Conference on Computer Vision Workshop (ICCVW) (2019), 2019, pp. 3617-3635.

Jouppi, Norman P, et al., "In-Datacenter Performance Analysis of a Tensor Processing Unit", To appear at the 44th International Symposium on Computer Architecture (ISCA), Toronto, Canada, Jun. 24-28, 2017, 2017, 17 pages.

Shaydyuk, Nazariy K, et al., "Semi-Streaming Architecture: A New Design Paradigm for CNN Implementation on FPGAs", Arxiv.org, Cornell University Library, 201 Library Cornell University Ithaca, NY 14853, XP081696811, Jun. 15, 2020, 8 pages.

Song, Jinook , et al., "7.1 An 11.5TOPS/W 1024-MAC Butterfly Structure Dual-Core Sparsity-Aware Neural Processing Unit in 8nm Flagship Mobile SoC", 2019 IEEE International Solid-State Circuits Conference—(ISSCC), San Francisco, CA, USA, 2019, pp. 130-132.

Su, Rongfeng et al., "Convolutional neural network bottleneck features for bi-directional generalized variable parameter HMMs", 2016 IEEE International Conference on Information and Automation (ICIA), Ningbo, China, doi: 10.1109/ICInfA.2016.7831988, 2016, 7 pages.

Szegedy, Christian , et al., "Going Deeper with Convolutions", 2015 IEEE Conference on Computer Vision and Pattern Recognition (CVPR), Boston, MA, 2015, pp. 1-9.

* cited by examiner

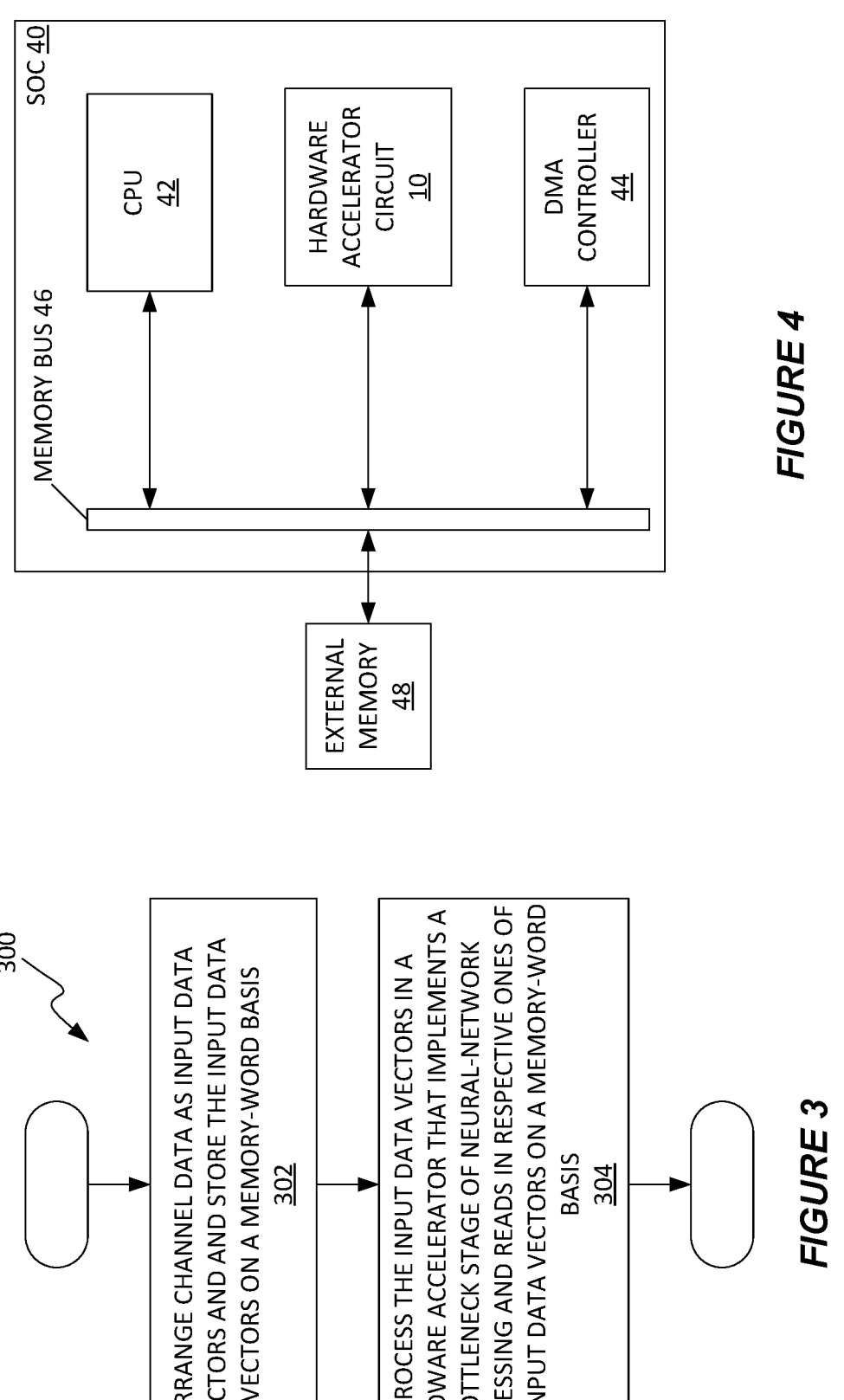

FIGURE 4

SOC 40

MEMORY BUS 46

CPU 42

HARDWARE ACCELERATOR CIRCUIT 10

DMA CONTROLLER 44

EXTERNAL MEMORY 48

ARRANGE CHANNEL DATA AS INPUT DATA VECTORS AND AND STORE THE INPUT DATA VECTORS ON A MEMORY-WORD BASIS 302

PROCESS THE INPUT DATA VECTORS IN A HARDWARE ACCELERATOR THAT IMPLEMENTS A BOTTLENECK STAGE OF NEURAL-NETWORK PROCESSING AND READS IN RESPECTIVE ONES OF THE INPUT DATA VECTORS ON A MEMORY-WORD BASIS 304

METHODS AND APPARATUSES FOR BOTTLENECK STAGES IN NEURAL-NETWORK PROCESSING

TECHNICAL FIELD

Methods and apparatuses disclosed herein relate to neural-network processing and specifically relate to bottleneck stages in neural-network processing.

BACKGROUND

Neural networks are currently the state-of-the-art for various kinds of data processing, with one example being image processing applications such as object detection, classification, and segmentation. Other example uses include speech and text processing, and diagnostics in everything from industrial machinery to healthcare.

A typical neural network used for image processing or other pattern-related analysis is a relatively regular feed-forward structure with few or no data dependencies, properties that complement hardware implementation. However, the number of arithmetic operations that are required to do a single inference is significant, in the order of hundreds or thousands of millions of multiplications and additions. Inference at a high frame rate for real-time video processing increases this number further by one or two magnitudes. Here, "inference" refers to a trained neural network inferring a result from input data, such as classifying an object depicted in input image data.

Convolutional neural networks, "CNNs" or "ConvNets", are a class of so-called "deep" neural networks that are often used for image processing, although CNNs find use in an increasing variety of applications. Extensive example information regarding CNN theory, structure, and operation appears in Michelucci, Umberto, *Advanced Applied Deep Learning: Convolutional Neural Networks and Object Detection*, Apress, 2019.

As a simplified overview, CNNs use multiple layers to recognize patterns or features of interest that are present within an input set of data, which, as a non-limiting example, may be an image. While the initial layer or layers of the CNN may include "filters" that recognize simple patterns or features, each layer feeds the next, and inner layers of the CNN generally include filters that recognize patterns of patterns or other abstractions and remove the spatial dependencies.

Each convolutional filter or "kernel" used by a given layer in the CNN comprises a smaller "window" of weights that is convolved (scanned or traversed stepwise) through or over the input data to the layer, where the input data comprises a grid or set of data values for each of one or more "channels." In turn, the convolution results produced by each filter produces a feature map whose values represent the extent to which the corresponding feature was detected in the input data. These results may be understood as constituting one "channel" of output data from the layer and because, except in "depth-wise" processing, each filter is respectively applied to all channels of input data, the number of channels input to successive layers in a CNN may become quite large.

Consider an example case where the input data to the first layer of a CNN is an image that comprises an D×E grid of pixel values for each of three color channels C, thus constituting input data to the first layer having dimensions D×E×C. Assuming that the recognition task associated with the CNN is detection of certain numerals or letters within the image, the first layer may have a number of relatively simple filters, e.g., one filter designed to detect vertical edges, one designed to detect horizontal edges, one designed to detect slanting edges, etc. Applying each of these filters to the D×E data set associated with each color channel produces a corresponding set of convolution results or output data, where the output data resulting from the application of a specific filter to a specific channel of input data may be regarded as a resulting feature map that constitutes a new channel of data for the next layer in the CNN.

CNNs generally include various types of layers, including so-called "pooling" layers that decrease the spatial dependencies associated with pattern detection. Further, so-called "bottleneck" layers or structures represent a key innovation having vital importance especially in very deep CNNs. Bottleneck layers in CNNs encourage the network to compact or compress relevant information while discarding redundant information. CNNs having significant depth—many layers—may use more than one bottleneck layer positioned within the cascade of successive layers. The compression operations performed by a bottleneck layer depend on 1×1 convolutions and may be understood as combining features across feature maps.

Example details and further information on the use of bottleneck layers in CNNs appears in R. Su, X. Liu and L. Wang, "Convolutional neural network bottleneck features for bi-directional generalized variable parameter HMMs," 2016 IEEE International Conference on Information and Automation (ICIA), Ningbo, 2016, pp. 1126-1131. Further, see C. Szegedy et al., "Going deeper with convolutions," 2015 IEEE Conference on Computer Vision and Pattern Recognition (CVPR), Boston, M A, 2015, pp. 1-9.

As CNN depth grows, so too grows the computational and bandwidth requirements of the processing systems used to implement deep CNNs. Each subsequent layer of the CNN takes the output data—the activations—of the preceding layer as its input data, and each layer has a potentially large set of weights used to produce its own computational results for the next layer. Consequently, carrying out the computations needed to realize the processing embodied by a CNN requires manipulating large sets of data, including large sets of weights, large sets of input data and output data, and performing many multiplications and summations.

Contemporary Graphics Processing Units or "GPUs" include multiple features that make them well suited for implementation of deep CNNs. Among their key advantages, GPUs include dedicated computation hardware that accelerates the multiplications and summations used to implement convolutional filtering, and they provide high bandwidth interfaces to external memory, allowing them to move large chunks of data to and from the external memory at high speeds. However, such features have downsides. For example, mapping of neural-network topologies onto a GPU is done by processing one network layer at a time and storing intermediate data in the off-chip memory. Such mapping results in significant activity of the of-chip memory and the interconnection bus, which consumes significant power.

Efforts at optimizing processing structures for neural processing represent an advance over GPUs, in at least some respects. See, e.g., J. Song et al., "7.1 An 11.5TOPS/W 1024-MAC Butterfly Structure Dual-Core Sparsity-Aware Neural Processing Unit in 8 nm Flagship Mobile SoC," 2019 IEEE International Solid-State Circuits Conference—(ISSCC), San Francisco, CA, USA, 2019, pp. 130-132. Other efforts at realizing deep-learning processors offering balanced performance and power consumption include, for example, the KIRIN 980 and 990 chipsets from HiSilicon, the P90 chipset from HELIO, and the EXYNOS 9825 chipset from Samsung.

Such hardware accelerators for neural networks, often referred to as "Neural Processing Units" or "NPUs", can be more effective than GPUs at carrying out the arithmetic and logical operations used in the realization of neural networks. However, they exhibit the same or similar problems as GPUs with respect to the need for frequent, high-speed transfers to and from external memories, as a consequence of how the neural-processing topology is mapped into the hardware realization.

SUMMARY

Methods and apparatuses herein improve bottleneck-layer processing in neural networks. Example advantages include reducing the number of accesses needed to external memory, allowing processing to run in parallel in successive bottleneck layers, based on the use of partial convolutional results, and balancing the amount of "local" memory used for storing convolutional results against the computational overhead of recomputing partial results. One aspect of the methods and apparatuses involves co-locating arithmetic and logical operators and temporary storage in the same data path, with the approach yielding both higher performance and greater energy efficiency in the implementation of bottleneck layers for neural network processing.

In an example embodiment, a hardware accelerator circuit is configured as a bottleneck stage for neural-network processing and includes convolution circuitry comprising a data path that includes a series of first, second, and third convolution stages, memory circuitry comprising first, second, and third stage-input buffers for the first, second, and third convolution stages, along with an output buffer and a weight buffer, and control circuitry and associated bus interface circuitry. The control circuitry is configured to read input data vectors in from an external memory into the first stage-input buffer and to write corresponding output data vectors from the output buffer back to the external memory.

The first convolution stage comprises a $1\times1\times M$ convolution circuit that is configured to use respective weights from the weight buffer to produce first convolution results for respective input data vectors held in the first stage-input buffer. Each input data vector is one among a set of input data vectors to be processed by the hardware accelerator circuit and comprises a stack of N channel values corresponding to a respective grid position of an input data grid associated with the set of input data vectors. The first convolution results for each input vector are an expanded vector of M channel values, where $M>N$. The second convolution stage comprises a depth-wise $R\times R\times1$ convolution circuit that is configured to use respective weights from the weight buffer to produce second convolution results for respective $R\times R$ subsets of the expanded vectors. The second stage-input buffer holds, at least incrementally, the first convolution results produced by the first convolution stage. The third convolution stage comprises a further $1\times1\times S$ convolution circuit that is configured to use respective weights from the weight buffer to produce third convolution results from the second convolution results. The third stage-input buffer holds, at least incrementally, the second convolution results produced by the second convolution stage.

The third convolution results comprise compressed vectors corresponding to each input data vector being processed in a current processing cycle of the hardware accelerator circuit, each compressed vector having a length S, where S may or may not equal N. That is, the number of output channels may or may not equal the number of input channels. In any case, the control circuitry is configured to write respective output data vectors held in the output data buffer back to the external memory. Each output data vector corresponds to a respective one of the input data vectors in the set of input data vectors and comprises the corresponding compressed vector produced by the third convolution stage, or a combination of the corresponding compressed vector produced by the third convolution stage and the respective input data vector.

As a related example embodiment, an integrated System-on-a-Chip (SoC) includes a hardware accelerator circuit as described above and further includes a Central Processing Unit (CPU) configured to control the hardware accelerator circuit for neural-network processing. Further, the example SoC embodiment includes a Direct Memory Access (DMA) controller configured to interface the hardware accelerator circuit with the external memory via the bus interface circuitry.

Another related embodiment, a wireless communication device includes a hardware accelerator circuit as described above, along with communication circuitry configured for transmitting communication signals for and receiving communication signals from a wireless communication network. Further, the example wireless communication device includes processing circuitry operatively associated with the communication circuitry and configured to implement neural-network processing on data received via the communication circuitry or a wired interface of the wireless communication device, or on data acquired from one or more sensors of the wireless communication device. The processing circuitry is configured to use the hardware accelerator for implementation of one or more bottleneck stages used in the neural-network processing.

In yet another example embodiment, a method of neural-network processing includes arranging channel data as input data vectors and storing the input data vectors in a memory circuit on a memory-word basis. The channel data results from processing original input data through one or more layers of a neural network. Each input data vector corresponds to a respective grid position in a data grid associated with the original input data and comprises a stack of N channel values corresponding to N channels of data resulting from the processing.

The method includes processing the input data vectors in a hardware accelerator circuit that implements a bottleneck stage of the neural-network processing and reads in respective ones of the input data vectors from the memory circuit on the memory-word basis. Processing the input data vectors in the hardware accelerator circuit includes producing first convolution results via a first convolution stage that performs $1\times1\times M$ convolutions on the input data vectors read into the hardware accelerator circuit, producing second convolution results via a second convolution stage that performs $R\times R\times1$ depth-wise convolutions of the first convolution results produced for respective subsets of the input data vectors read into the hardware accelerator circuit, and producing third convolution results via a third convolution stage that performs $1\times1\times S$ convolutions on the second convolution results.

The third convolution results are respective compressed data vectors for each subset of input data vectors read into the hardware accelerator circuit and the method further includes writing output data vectors back to the memory circuit, or another memory circuit. Each output data vector corresponds to a respective one of the input data vectors in the set of input data vectors and comprises the corresponding compressed vector produced by the third convolution stage, or a combination of the corresponding compressed vector produced by the third convolution stage and the respective input data vector.

Of course, the contemplated methods and apparatuses are not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a logic flow diagram illustrating one embodiment of a method of bottleneck-layer processing using a hardware accelerator circuit, such as the one depicted in FIG. 1.

FIG. 4 is a block diagram of one embodiment of a System-On-a-Chip (SoC) that includes a hardware accelerator circuit implementing bottleneck-layer processing for a neural network.

DETAILED DESCRIPTION

Figure 1:
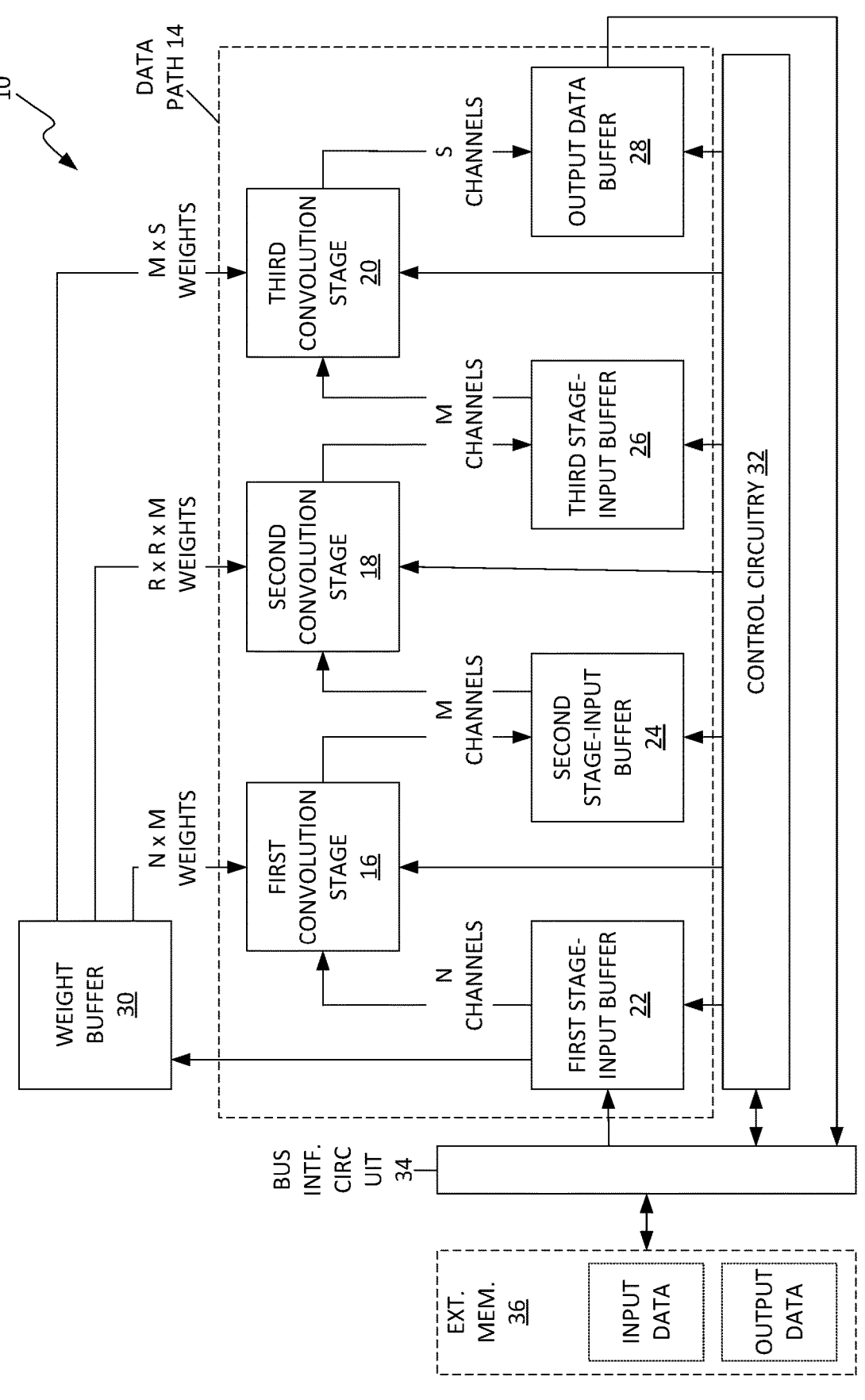
FIG. 1 is a block diagram of one embodiment of a hardware accelerator circuit implementing bottleneck-layer processing for a neural network.

State-of-the-art neural networks for image processing and other application are commonly based on the so called "bottleneck-layer" structure, where the number of channels vary significantly between layers. The number of channels is proportional to the amount of data transferred between layers and it has been shown that it is possible to limit convolutions to 1×1×F and the so-called "depth-wise" G×G×1 within the bottleneck layers, without losing performance, where F and G are integer values. Popular networks conforming to this architectural approach include Resnets, Mobilenets, Shufflenets, deeply supervised object detectors, and more. One or more embodiments of the hardware accelerator and associated methods contemplated herein are optimized for such operations. For example references, see K. He, X. Zhang, S. Ren and J. Sun, "Deep Residual Learning for Image Recognition," 2016 IEEE Conference on Computer Vision and Pattern Recognition (CVPR), Las Vegas, NV, 2016, pp. 770-778; and H. Chen and C. Su, "An Enhanced Hybrid MobileNet," 2018 9th International Conference on Awareness Science and Technology (iCAST), Fukuoka, 2018, pp. 308-312.

One problem is that from a circuit perspective, the number of channels involved in bottleneck processing may be large, with correspondingly large amounts of data—processing results—going between layers. A hardware accelerator circuit proposed herein uses on-chip memory to store intermediate results and thereby reduce the number of off-chip memory accesses to a bare minimum. Onboard "local" memory stores the features between layers where the number of channels is at a local maximum. A custom data path connected to the memory processes up to three layers of a bottleneck stage without exercising the local memory more than would be exercised by a single layer in a conventional implementation. Of course, the memory or memories that form the local memory for use in the data path may be multiplexed or otherwise shared with other processing functions.

The contemplated architecture also allows for balancing between the number of computations that need to be carried out versus the size(s) of local memory. Particularly, a large local memory minimizes the number of computations because there is room for storing all partial results generated in each of the involved layers. Smaller memory sizes add to processing overhead because the lack of memory space requires the re-computation of at least some partial results rather than holding them in memory. The optimal setting in terms of memory size versus re-computation overhead depends on the targeted application.

The word length of the local memories may be, for example, wide enough to store data corresponding to N channels, where N could for example be 32. This arrangement means that with a carefully designed data path of the contemplated hardware accelerator circuit, 32 values could be operated on in parallel, in a single clock cycle. The proposed architecture in one or more embodiments can feed up to N×N multipliers in parallel. With an N of 32, this capability corresponds to 1024 multiplications per clock cycle. A data path with 32×32 multipliers could in theory execute a half-billion multiplications in half a million clock cycles, corresponding to a frame rate of 2000 frames per second assuming a 1 GHz system clock, e.g., for a typical MobileNet-like network. Such capabilities hold significant promise for a range of power-sensitive applications, such as mobile computing devices.

FIG. 1 illustrates an example embodiment of a hardware accelerator circuit 10 ("circuit 10") configured as a bottleneck stage for neural-network processing. The circuit 10 includes convolution circuitry comprising a data path 14 that includes a series of first, second, and third convolution stages 16, 18, and 20, and further includes memory circuitry comprising first, second, and third stage-input buffers 22, 24, and 26 for the first, second, and third convolution stages, along with an output data buffer 28 and a weight buffer 30. Still further, the circuit 10 includes control circuitry 32, which is associated with bus interface circuitry 34. The control circuitry 32 is configured to read input data vectors in from an external memory 36 into the first stage-input buffer 22 and to write corresponding output data vectors from the output data buffer 28 back to the external memory 36.

The first convolution stage 16 comprises a 1×1×M convolution circuit that is configured to use respective N×M weights from the weight buffer 30 to produce first convolution results for respective input data vectors held in the first stage-input buffer 22. Each input data vector is one among a set of input data vectors to be processed by the circuit 10 and comprising a "stack" of N channel values corresponding to a respective grid position of an input data grid associated with the set of input data vectors. The first convolution results for each input vector are an expanded vector of M channel values, where M and N are integers and M>N. As a non-limiting example, M is six times larger than N, i.e., M represents a 6× expansion of the number of channels N contained in the input data vectors.

The second convolution stage 18 comprises a depth-wise R×R×1 convolution circuit that is configured to use respective weights from the weight buffer 30 to produce second convolution results for respective R×R subsets of the expanded vectors. With "depth-wise" convolution, each channel is filtered separately.

Processing of the complete or overall set of input data vectors via the circuit 10 involves step-wise traversing the R×R window over the full data grid associated with the set of input data vectors. The second stage-input buffer 24 holds, at least incrementally, the first convolution results produced by the first convolution stage 16. An example value for R is three, such that the second convolution stage performs 3×3×1 depth-wise convolution, but other values of R may be used. Here, 3×3 refers to convolution occurring over 3×3 windows onto the data grid.

The third convolution stage 20 comprises a further 1×1×S convolution circuit that is configured to use respective weights from the weight buffer 30 to produce third convolution results from the second convolution results. The third stage-input buffer 26 holds, at least incrementally, the second convolution results produced by the second convolution stage 18, and the third convolution results comprise compressed vectors corresponding to each input data vector being processed in a current processing cycle of the circuit 10. Each compressed vector has a length S, where the number of output channels S may or may not be the same as the number of input channels N. However, the feature or pattern represented by the channels of the output data vectors differs from that of the input data vectors as a consequence of the channel-space expansion and subsequent compression provided by the bottleneck-stage operations provided by the circuit 10.

The control circuitry 32 is configured to write respective output data vectors held in the output data buffer 28 back to the external memory 36. Each output data vector corresponds to a respective one of the input data vectors in the set of input data vectors and comprises the corresponding compressed vector produced by the third convolution stage 20, or a combination of the corresponding compressed vector produced by the third convolution stage 20 and the respective input data vector.

The second convolution stage 18 in one or more embodiments is configured to begin producing the second convolution results based on incremental first convolution results, as output from the first convolution stage 16 for buffering in the second stage-input buffer 24. Similarly, the third convolution stage 20 in one or more such embodiments is configured to begin producing the third convolution results based on incremental second convolution results, as output from the second convolution stage 18 for buffering in the third stage-input buffer 26.

In one or more embodiments of the circuit 10, at least one of the second and third stage-input buffers 24 and 26 is sized to hold only incremental convolution results from the prior convolution stage 16 or 18, and the corresponding convolution stage 18 or 20 is configured to perform partial re-computations, to account for its stage-input buffer holding only incremental convolution results. Using smaller sizes for one or more of the stage-input buffers 24 and 26 may offer cost savings at the expense of requiring a certain number of the corresponding convolution results, or associated partial results, to be recomputed. The control circuitry 32 in one or more embodiments is configured to schedule an order of convolutional operations carried out by the circuit 10 to account for the second and third stage-input buffers 24 and 26 being too small to hold complete sets of stage-specific convolution results for a respective subset of input data vectors processed in each processing cycle of the circuit 10.

In the same or in one or more further embodiments, the control circuitry 32 is configured to read in respective input data vectors from the set of input data vectors on a memory-word basis. Such read operations depend on each input data vector being stored in the external memory 36 in a corresponding memory word or in corresponding contiguous memory words, depending on the vector length N of the input data vectors versus a memory-word length used by the external memory.

Here, and elsewhere, the "set of input data vectors" comprises the data set to be processed by the circuit 10 and it may be the starting or original data or it may be the processing results output from another layer in an overall neural network. And, of course, the circuit 10 may be used to implement more than one bottleneck layer within an overall neural network, with each use targeting a different input data set.

In other example details of interest, the control circuitry 32 is configured to populate the weight buffer 30 based on receiving weights from stored data in an internal memory of the circuit 10 or based on receiving weights from an external controller. Alternatively, in one or more example configurations of the circuit 10, the weight buffer 30 is configured to be writable directly by an external controller. In yet another embodiment, the weights used by the circuit 10 may be stored in an external memory and read in by the circuit 10.

As noted above, the control circuitry 32 is configured to write respective output data vectors held in the output data buffer 28 back to the external memory 36, where each output data vector corresponds to a respective one of the input data vectors in the set of input data vectors and comprises the corresponding compressed vector produced by the third convolution stage, or a combination of the corresponding compressed vector produced by the third convolution stage and the respective input data vector. In the latter, "combination" case, the combination comprises, for example, a concatenation or a summation of the corresponding compressed vector and the respective input data vector.

In one or more embodiments, the values of N, M, R, and S are fixed with respect to the implementation of the circuit 10. In one or more other embodiments, the circuit 10 is configurable or otherwise programmable with respect to any one or more of the values N, M, R, and S. Or, more generally, in at least one embodiment of the circuit 10, any one or more of the expansion factor used in the first convolution stage 16, the compression factor used in the third convolution stage 20, and the dimensions of the depth-wise convolutions performed by the second convolution stage 18 are configurable.

Figure 2:
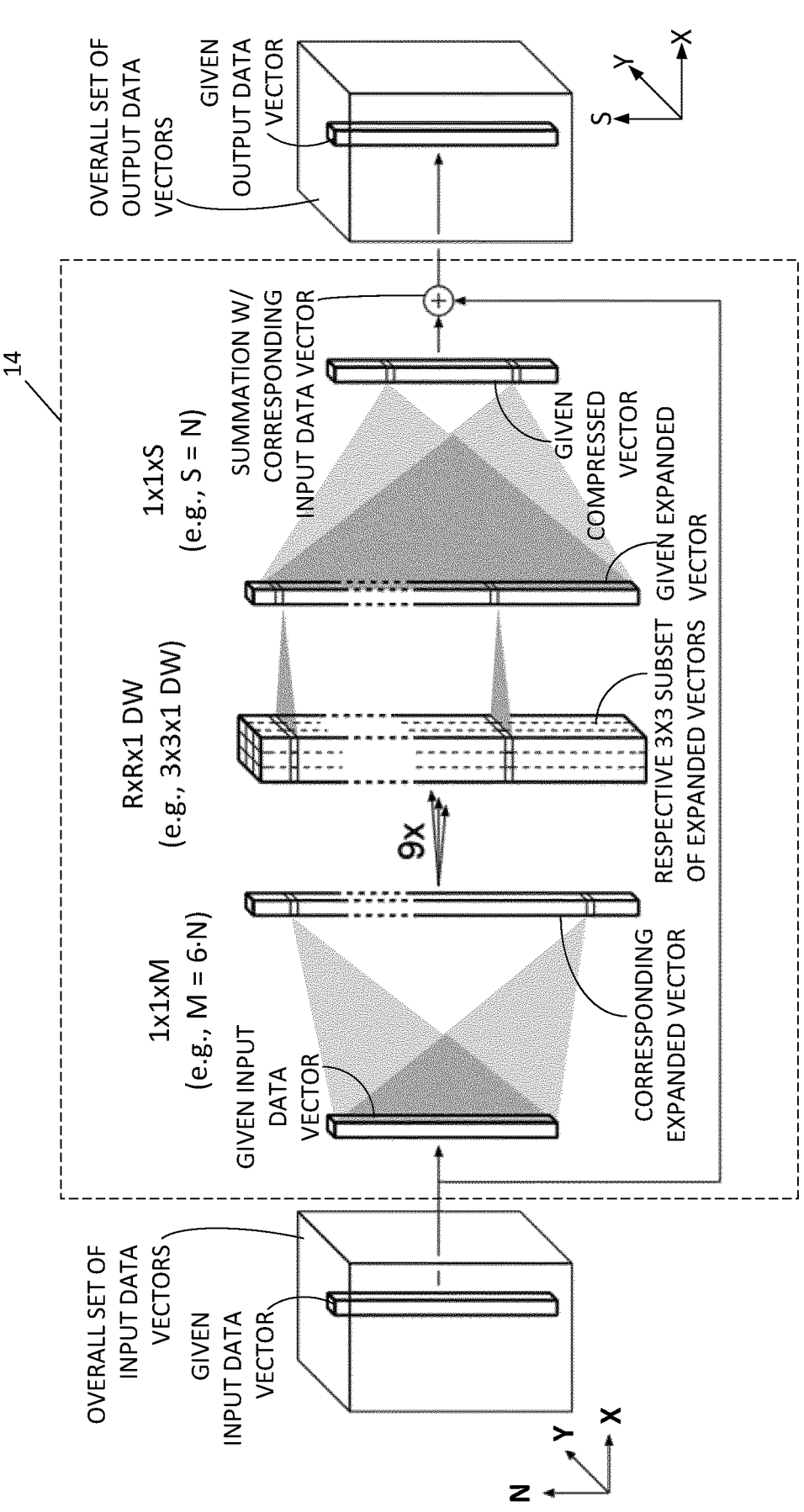
FIG. 2 is a block diagram of example details for a data path and convolutional operations associated with bottleneck-layer processing, according to the hardware accelerator circuit introduced in FIG. 1.

FIG. 2 offers a functional view of the circuit 10 and suggests operations implemented via the above-described bottleneck structure that is mapped to or otherwise embodied by the data path 14, for reducing the number of external memory accesses needed. A direct correlation exists between the details seen in FIG. 2 and the data path 14, with the understanding that the leftmost cuboid represents the set of input data vectors stored on a memory-word basis and the rightmost cuboid represents the corresponding set of output data vectors produced by the circuit and stored on a memory-word basis.

The leftmost cuboid may be referred to as the input data cuboid or, simply, the input data, while the rightmost cuboid may be referred to as the output data cuboid or, simply, the output data. Note that the leftmost cuboid represents a set of input data vectors, which may be output values from a preceding neural-network layer in an overall neural network, where such values may be referred to as "activations" in the lexicon of neural-network processing. Likewise, the rightmost cuboid represents the set of output data vectors produced by the circuit 10, and thus may be regarded as activations for a succeeding layer of the overall neural network.

The numeric values shown in FIG. 2 for the convolution stages are example values. In FIG. 2, the "X" and "Y" dimensions of the input-data cuboid represent the data grid associated with the set of input data vectors and, in an example case, correspond to {x, y} pixel positions in an image being processed in a neural network that uses the circuit 10. The vertical dimension of the input-data cuboid is "N" and represents the number of channels contained in the input data vectors. The output-data cuboid may or may not have the same channel depth as the input data cuboid—i.e., S may or may not equal N—but each output data vector corresponds to a respective one of the {x, y} positions in the data grid.

Forming the input-data cuboid in the external memory 36 involves storing each input data vector in grid order, on a memory-word basis, such that the circuit 10 obtains a complete input data vector—i.e., the full stack of "N" channel values for a given x-y grid position—by reading a single word from the external memory 36, or by reading consecutive words from the external memory 36, in cases where the length of the input data vectors exceeds the word size used by the external memory 36. Storing the input data vectors in grid order means storing them in order with respect to "traversing" the depth-wise R×R×1 convolution over the data grid in left-to-right/top-to-bottom fashion. A similar ordering and storage arrangement for writing out the output data vectors forms the output-data cuboid.

Going from left-to-right, FIG. 2 illustrates a single, given input data vector read in from the input-data cuboid, as would be held in the first-stage input buffer 22 of the circuit 10. Processing the given input data vector in the first convolution stage 16 produces a corresponding expanded data vector, where FIG. 2 depicts the expansion as being six times (6×)—i.e., in an example case, the number of channels M in the expanded vectors is six times greater than the number of channels N in the input data vectors. While a 6× expansion may be a representative value, the circuit 10 is not limited to 6× expansions and other multiples may be used.

Further, FIG. 2 depicts application of the depth-wise 3×3×1 convolution operations on a respective given 3×3 set of input data vectors, where 3×3×1 is a specific example of the more general R×R×1 depth-wise (DW) convolution performed by the second convolution stage 18. That is, the circuit 10 reads in the nine input data vectors from each 3×3 "window" of the overall data grid to which the 3×3 convolution is applied, with the corresponding respective 3×3 subsets of expanded vectors held in the second stage-input buffer 24 for processing by the second convolution stage 18. In another example, the second convolution stage 18 of the circuit 10 is configured to perform 5×5×1 DW convolutions as the R×R×1 DW convolutions.

The convolution results produced by the second convolution stage 18 are buffered in the third stage-input buffer 26, for channel compression via the 1×1×S convolution operations provided by the third convolution stage 20. The compression factor, as set by the value of S, used by the third convolution stage 20 may or may not correspond to the expansion factor, as set by the value of M, used by the first convolution stage 16.

In a case where S equals N, the length—number of channels—in the output data vectors matches that of the input data vectors, although the patterns/recognitions represented by the output channels differs as compared to the input channels. In at least one configuration, the compression factor matches the expansion factor, meaning that the output channel depth S matches the input channel depth of N.

FIG. 2 shows each output data vector formed as a summation of the involved compressed vector and the corresponding input data vector. The arrangement is non-limiting and respective ones of the compressed vectors may be stored as output data vectors without any combining, or other "combinations" may be used, such as concatenations of each compressed vector and the corresponding input data vector.

FIG. 3 illustrates one embodiment of a method 300 of neural-network processing. The method 300 includes arranging (Block 302) channel data as input data vectors and storing the input data vectors in a memory circuit on a memory-word basis. In an example case, the channel data results from processing original input data through one or more layers of a neural network and each input data vector corresponds to a respective grid position in a data grid associated with the original input data and comprises a stack of N channel values corresponding to N channels of data resulting from the processing.

The method 300 further includes processing (Block 304) the input data vectors in a hardware accelerator circuit that implements a bottleneck stage of the neural-network processing and reads in respective ones of the input data vectors from the memory circuit on the memory-word basis. With reference to the example circuit 10 of FIG. 1, "processing" the input data vectors in the hardware accelerator circuit comprises producing first convolution results via a first convolution stage 16 that performs 1×1×M convolutions on the input data vectors read into the circuit 10, producing second convolution results via a second convolution stage 18 that performs R×R×1 depth-wise convolutions of the first convolution results produced for respective subsets of the input data vectors read into the circuit 10, and producing third convolution results via a third convolution stage 20 that performs 1×1×S convolutions on the second convolution results.

The third convolution results are respective compressed data vectors for each subset of input data vectors read into the circuit 10. That is, the depth-wise R×R×1 convolutions of the second convolution stage 18 operate on R×R subsets of expanded vectors produced by operation of the first convolution stage 16 on individual ones of input data vectors in a corresponding R×R subset of input data vectors. Each such subset corresponds to a respective region of the data grid corresponding to the set of input data vectors.

The processing operations of Step 304 of the method 300 further includes writing output data vectors back to the memory circuit, or another memory circuit. Each output data vector corresponds to a respective one of the input data vectors in the set of input data vectors and comprises the corresponding compressed vector produced by the third convolution stage 20, or a combination of the corresponding compressed vector produced by the third convolution stage 20 and the respective input data vector.

With momentary reference back to FIG. 2, the channel data processed in the example method 300 is arranged in the memory circuit as a cube of input data columns, each input data column being a respective one of the input data vectors. Correspondingly, writing the output data vectors from the circuit 10 back to the memory circuit or the other memory circuit comprises forming a cube of output data columns corresponding to the cube of input data columns, each output data column being a respective one of the output data vectors.

Processing in Step 304 of the method 300 includes, in one or more embodiments, controlling an order of convolution operations performed by the convolution stages 16, 18, and of the circuit 10 to allow a succeeding convolution stage to begin producing convolution results before the convolution results of the preceding convolution stage are complete. For example, the succeeding convolution stage does not need the complete set of multiply-and-accumulate results from the preceding convolution stage to begin its computations and can therefore begin computing at least partial results for its own-stage convolutions before the preceding convolution stage completes its computations for the vectors currently being processed.

As noted, in embodiments where the output data vectors are combinations of the corresponding compressed vectors and the respective input data vectors, the combinations may be formed as a concatenation or a summation of each compressed vector and the respective input data vector.

FIG. 4 illustrates another example embodiment wherein an integrated System-on-a-Chip (SoC) 40 comprises a hardware accelerator circuit, such as the circuit 10 of FIG. 1. Further, the example SoC 40 includes a Central Processing Unit (CPU) 42 configured to control the circuit 10 for neural-network processing and a Direct Memory Access (DMA) controller 44 configured to interface the circuit 10 with the external memory 48 via the bus interface circuitry 34 of the circuit 10, which couples to a memory bus 46, for example.

In an example embodiment, the DMA controller 44 is programmed to read and write chunks of data from/to the external memory 48. That is, the DMA controller 44 moves chunks of input data and output data between the circuit 10 and the external memory 48. In an example implementation, the CPU 42 executes computer program instructions that cause it to control the circuit 10. Data for processing by the circuit 10 is fetched from the external memory 48, or other memory not shown (such as other memory of the SoC 40) and fed into the circuit 10, which begins processing it. Eventually, the circuit 10 produces output data—output data vectors—that needs to be stored either onboard the SoC 40 or in external memory 48. This process repeats for all layers of the overall neural network that make use of the processing provided by the circuit 10.

Figure 5:
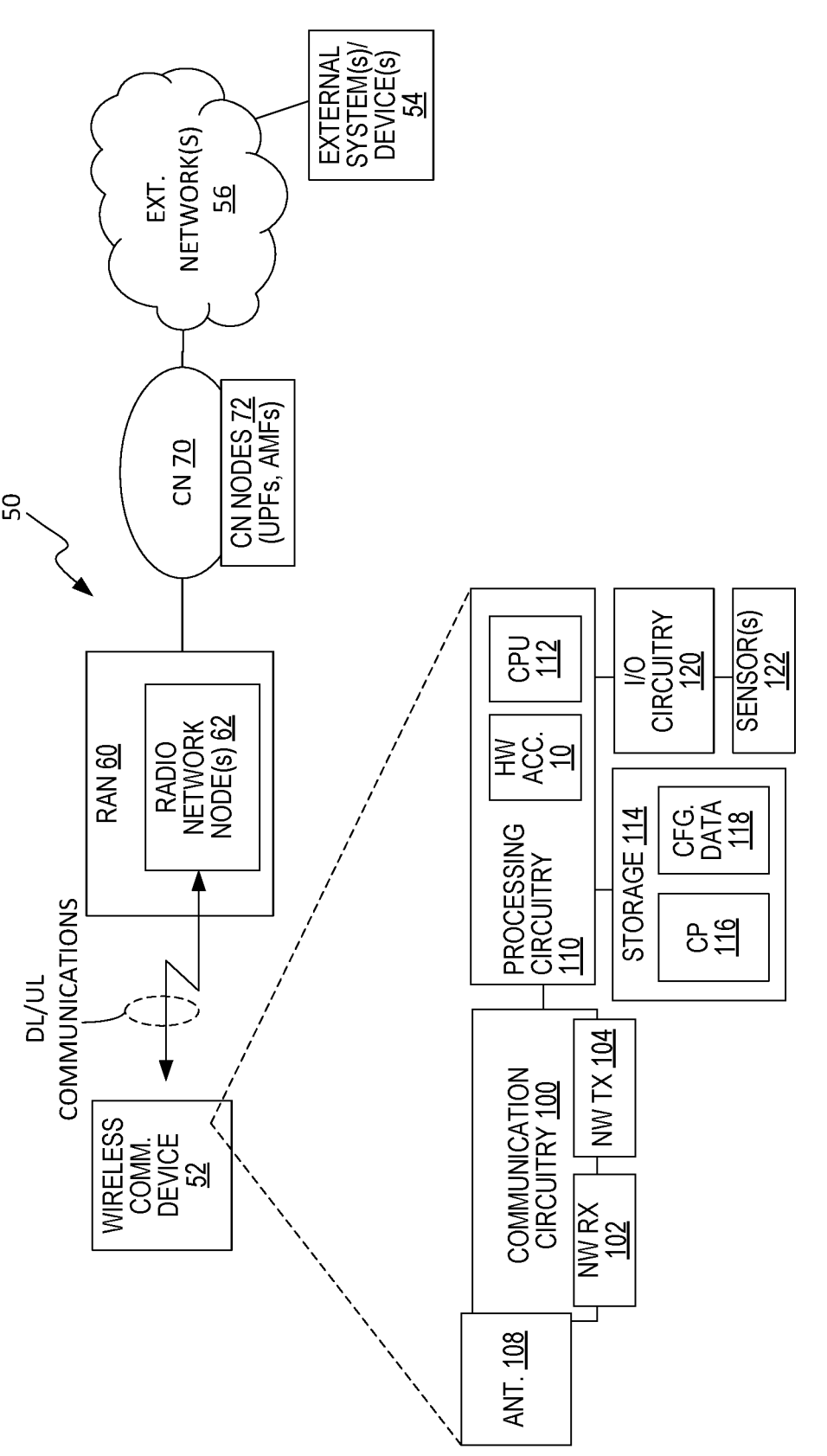
FIG. 5 is a block diagram of an example wireless communication device and an associated wireless communication network, where the device includes a hardware accelerator for bottleneck-layer processing for a neural network.

FIG. 5 illustrates an example wireless communication network 50. A wireless communication device 52 is configured for communicating with the network 50, e.g., for using the network 50 as an access network for communicative coupling to one or more external systems or devices 54 that are accessible via the Internet or other external networks 56. The network 50 includes a RAN 60 that includes one or more radio network nodes 62. The RAN 60 couples to a Core Network (CN) 70 that includes multiple CN nodes 72, providing, for example, access and mobility management functions (AMFs) and user plane functions (UPFs), for connecting and authenticating the device 52 and for routing data to/from the device 52 with respect to the external systems/devices 54.

The device 52 in the example implementation illustrated in FIG. 5 includes communication circuitry 100, including a network (NW) receiver 102 configured for receiving Downlink (DL) signals transmitted by one or more of the radio network nodes 62 of the RAN 60 and a NW transmitter 104 for transmitting Uplink (UL) signals for reception by such nodes. Antenna(s) 108 provide for signal transmission and reception with respect to communication circuitry 100, where the DL and UL signals may be referred to broadly as communication signals.

Processing circuitry 110 of the device 52 is operatively associated with the communication circuitry 100, e.g., the processing circuitry sends and receives information (messages, user traffic, control signaling, etc.) via the communication circuitry 100. The processing circuitry 110 includes an implementation of the hardware accelerator circuit 10 introduced in FIG. 1 and has a CPU 112 that is configured for a variety of processing operations, including implementation of a neural network that uses the circuit 10 for implementation of one or more bottleneck stages of the neural network.

In particular, the device 52 uses circuit 10 for bottleneck-stage processing within an overall CNN implemented via the processing circuitry 110. In an example case, the wireless communication device 52 performs neural-network processing on data received wirelessly and/or on data obtained via one or more cameras or other sensors of the wireless communication device 52, such as for object recognition/classification, image enhancement, etc. That is, the processing circuitry 110 is configured to implement neural-network processing on sensor data acquired from one or more sensors of the device 52 or received via the communication circuitry 100, including being configured to use the circuit 10 for implementation of one or more bottleneck stages used in the neural-network processing.

The device 52 in the example embodiment further includes storage 114, e.g., for storing one or more computer programs (CPs) 116 and/or configuration data (CFG. DATA) 118. The one or more computer programs 116 include, for example, at least one program that implements neural-network processing that takes advantage of the circuit 10 for bottleneck-stage processing, and the configuration data 118 may include, for example, weights determined from training of the involved neural network.

Further, the device 52 in the example embodiment includes input/output (I/O) circuitry 120 configured for interfacing to one or more sensors 122 included in the device 52. As a non-limiting example, the sensor(s) 122 include a camera operative to capture images and/or video, and the device 52 uses the circuit 10 for bottleneck-stage processing in an overall neural network applied by the CPU 112 to image data captured via the camera. In such embodiments, the one or more sensors 122 comprise one or more image sensors, and the set of input data vectors operated on by the circuit 10 corresponds to neural-net processing of input image data obtained from the one or more image sensors. Correspondingly, the input data grid associated with the set of input data vectors represent spatial locations within an image embodied in the image data.

While not explicitly shown in FIG. 5, the device 52 in one or more embodiments has a battery and associated power-supply circuitry that is configured to provide regulated power to the communication circuitry 100, the processing circuitry 110, the storage 114, the I/O circuitry 120, and the sensor(s) 122. In such contexts, use of the circuit 10 for bottleneck-stage processing requires less power than would be needed for comparable processing performance from a traditional GPU/NPU implementation of bottleneck-stage processing.

In one or more embodiments, the SoC 40 and/or the device 52 include processing circuitry or other hardware that is configured to perform other types of neural-network layers, to support various overall neural-network implementations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A hardware accelerator circuit configured as a bottleneck stage for neural-network processing and comprising:

convolution circuitry comprising a data path that includes a series of first, second, and third convolution stages;

memory circuitry comprising first, second, and third stage-input buffers for the first, second, and third convolution stages, along with an output data buffer and a weight buffer; and control circuitry and associated bus interface circuitry, the control circuitry configured to read input data vectors in from an external memory into the first stage-input buffer and to write corresponding output data vectors from the output data buffer back to the external memory;

wherein the first convolution stage comprises a 1×1×M convolution circuit that is configured to use respective weights from the weight buffer to produce first convolution results for respective input data vectors held in the first stage-input buffer, each input data vector being one among a set of input data vectors to be processed by the hardware accelerator circuit and comprising a stack of N channel values corresponding to a respective grid position of an input data grid associated with the set of input data vectors, the first convolution results for each input vector being an expanded vector of M channel values, where M>N;

wherein the second convolution stage comprises a depthwise R×R×1 convolution circuit that is configured to use respective weights from the weight buffer to produce second convolution results for respective R×R subsets of the expanded vectors, and wherein the second stage-input buffer holds, at least incrementally, the first convolution results produced by the first convolution stage;

wherein the third convolution stage comprises a further 1×1×S convolution circuit that is configured to use respective weights from the weight buffer to produce third convolution results from the second convolution results, wherein the third stage-input buffer holds, at least incrementally, the second convolution results produced by the second convolution stage, where third convolution results comprise compressed vectors corresponding to each input data vector being processed in a current processing cycle of the hardware accelerator circuit, each compressed vector having a length S, where S<M; and wherein the control circuitry is configured to write respective output data vectors held in the output data buffer back to the external memory, each output data vector corresponding to a respective one of the input data vectors in the set of input data vectors and comprising the corresponding compressed vector produced by the third convolution stage, or a combination of the corresponding compressed vector produced by the third convolution stage and the respective input data vector.

2. The hardware accelerator circuit of claim 1, wherein the second convolution stage is configured to begin producing the second convolution results based on incremental first convolution results, as output from the first convolution stage for buffering in the second stage-input buffer, and wherein the third convolution stage is configured to begin producing the third convolution results based on incremental second convolution results, as output from the second convolution stage for buffering in the third stage-input buffer.

3. The hardware accelerator circuit of claim 1, wherein at least one of the second and third stage-input buffers is sized to hold only incremental convolution results from the prior convolution stage, and the corresponding convolution stage is configured to perform partial re-computations, to account for its stage-input buffer holding only incremental convolution results.

4. The hardware accelerator circuit of claim 1, wherein the control circuitry is configured to schedule an order of convolutional operations carried out by the hardware accelerator circuit to account for the second and third stage-input buffers being too small to hold complete sets of stage-specific convolution results for a respective subset of input data vectors processed in each processing cycle of the hardware accelerator circuit.

5. The hardware accelerator circuit of claim 1, wherein the control circuitry is configured to read in respective input data vectors from the set of input data vectors on a memory-word basis, in dependence on each input data vector being stored in a corresponding memory word or in corresponding contiguous memory words, depending on the vector length N of the input data vectors versus a memory-word length used by the external memory.

6. The hardware accelerator circuit of claim 1, wherein the control circuitry is configured to populate the weight buffer from stored data in an internal memory of the hardware accelerator circuit or based on receiving weights from an external controller, or wherein the weight buffer is configured to be writable directly by the external controller.

7. The hardware accelerator circuit of claim 1, wherein the combination of the corresponding compressed vector produced by the third convolution stage and the respective input data vector comprises a concatenation or a summation of the corresponding compressed vector and the respective input data vector.

8. The hardware accelerator circuit of claim 1, wherein R is an integer value greater than or equal to 3.

9. The hardware accelerator circuit of claim 1, wherein S equals N.

10. An integrated System-on-a-Chip (SoC) comprising the hardware accelerator circuit of claim 1, the SoC further comprising a Central Processing Unit (CPU) configured to control the hardware accelerator circuit for neural-network processing and a Direct Memory Access (DMA) controller configured to interface the hardware accelerator circuit with the external memory via the bus interface circuitry.

11. A wireless communication device comprising:

the hardware accelerator circuit of claim 1;

communication circuitry configured for transmitting communication signals for and receiving communication signals from a wireless communication network; and processing circuitry operatively associated with the communication circuitry and configured to implement neural-network processing of data received via the communication circuitry or acquired via one or more sensors of the wireless communication device, including being configured to use the hardware accelerator for implementation of one or more bottleneck stages used in the neural-network processing.

12. The wireless communication device of claim 11, wherein the one or more sensors comprise one or more image sensors, and wherein the set of input data vectors corresponds to neural-net processing of input image data obtained from the one or more image sensors.

13. The wireless communication device of claim 12, wherein the input data grid associated with the set of input data vectors represents spatial locations within an image embodied in the image data.

14. The method of claim 11, wherein R is an integer value greater than or equal to 3.

15. The method of claim 11, wherein S equals N.

16. A method of neural-network processing, the method comprising:

arranging channel data as input data vectors and storing the input data vectors in a memory circuit on a memory-word basis, the channel data resulting from processing original input data through one or more layers of a neural network and each input data vector corresponding to a respective grid position in a data grid associated with the original input data and comprising a stack of N channel values corresponding to N channels of data resulting from the processing; and processing the input data vectors in a hardware accelerator circuit that implements a bottleneck stage of the neural-network processing and reads in respective ones of the input data vectors from the memory circuit on the memory-word basis;

wherein processing the input data vectors in the hardware accelerator circuit comprises:

producing first convolution results via a first convolution stage that performs 1×1×M convolutions on the input data vectors read into the hardware accelerator circuit, where M>N;

producing second convolution results via a second convolution stage that performs R×R×1 depth-wise convolutions of the first convolution results produced for respective subsets of the input data vectors read into the hardware accelerator circuit;

producing third convolution results via a third convolution stage that performs 1×1×S convolutions on the second convolution results, the third convolution results being respective compressed data vectors for each subset of input data vectors read into the hardware accelerator circuit, where S<M; and writing output data vectors back to the memory circuit, or another memory circuit, wherein each output data vector corresponds to a respective one of the input data vectors in the set of input data vectors and comprises the corresponding compressed vector produced by the third convolution stage, or a combination of the corresponding compressed vector produced by the third convolution stage and the respective input data vector.

17. The method of claim 16, wherein the channel data is arranged in the memory circuit as a cube of input data columns, each input data column being a respective one of the input data vectors, and wherein writing the output data vectors from the hardware accelerator circuit back to the memory circuit or the other memory circuit comprises forming a cube of output data columns corresponding to the cube of input data columns, each output data column being a respective one of the output data vectors.

18. The method of claim 16, wherein processing the input data vectors in the hardware accelerator circuit further includes controlling an order of convolution operations performed by the convolution stages of the hardware accelerator circuit to allow a succeeding convolution stage to begin producing convolution results before the convolution results of the preceding convolution stage are complete.

19. The method of claim 16, wherein the combination of the corresponding compressed vector produced by the third convolution stage and the respective input data vector comprises a concatenation or a summation of the corresponding compressed vector and the respective input data vector.

* * * * *